United States Patent [19]
Schaffer

[11] 3,866,632
[45] Feb. 18, 1975

[54] REINFORCED HOSE AND METHOD

[75] Inventor: William G. Schaffer, Englewood, Colo.

[73] Assignee: The Gates Rubber Company, Denver, Colo.

[22] Filed: July 2, 1973

[21] Appl. No.: 375,965

[52] U.S. Cl. ............... 138/130, 138/125, 138/132
[51] Int. Cl. ............................................. F16l 11/08
[58] Field of Search ......... 138/130, 129, 137, 124, 138/125, 126, 132

[56] References Cited
UNITED STATES PATENTS

| | | | |
|---|---|---|---|
| 746,319 | 12/1903 | Frees | 138/124 |
| 2,624,366 | 1/1953 | Pugh | 138/137 X |
| 3,189,053 | 6/1965 | Parr | 138/133 |
| 3,559,693 | 2/1971 | Reynard | 138/137 X |
| 3,599,677 | 8/1971 | O'Brien | 138/137 X |
| 3,814,138 | 6/1974 | Courtot | 138/137 X |

*Primary Examiner*—Richard C. Queisser
*Assistant Examiner*—Daniel M. Yasich
*Attorney, Agent, or Firm*—H. W. Oberg, Jr.; Raymond Fink; Curtis H. Castleman, Jr.

[57] ABSTRACT

A flexible hose with a tube having one or more ribs radially extending therefrom, the tube reinforced with a plurality of twined strands that are mechanically retained in spaced relationship by the rib or ribs.

5 Claims, 7 Drawing Figures

PATENTED FEB 18 1975
3,866,632
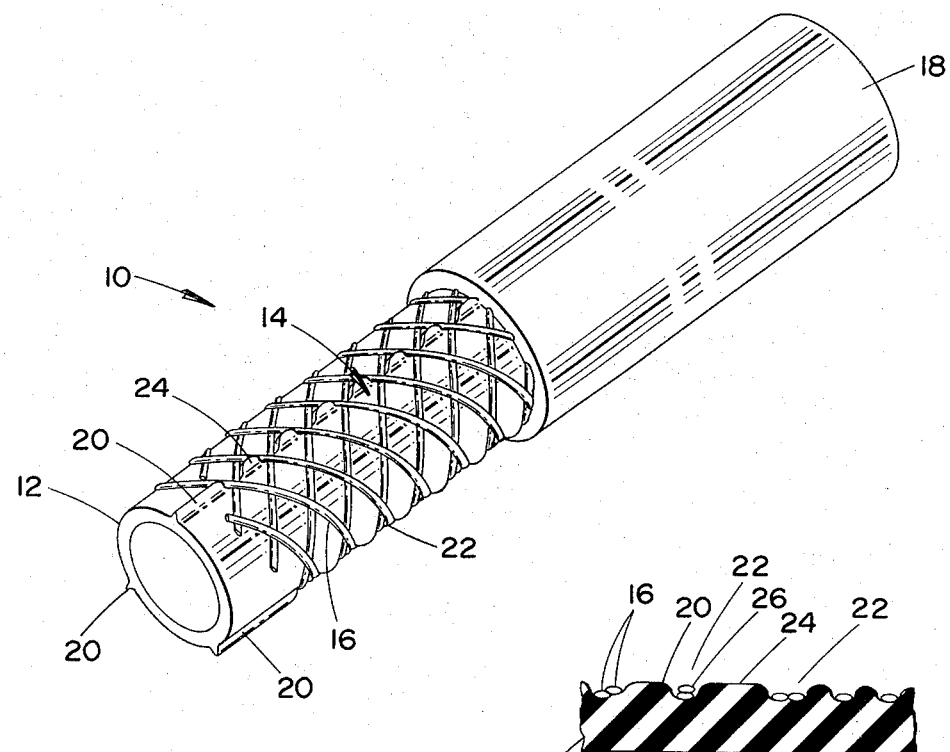
FIG. 1
FIG. 3
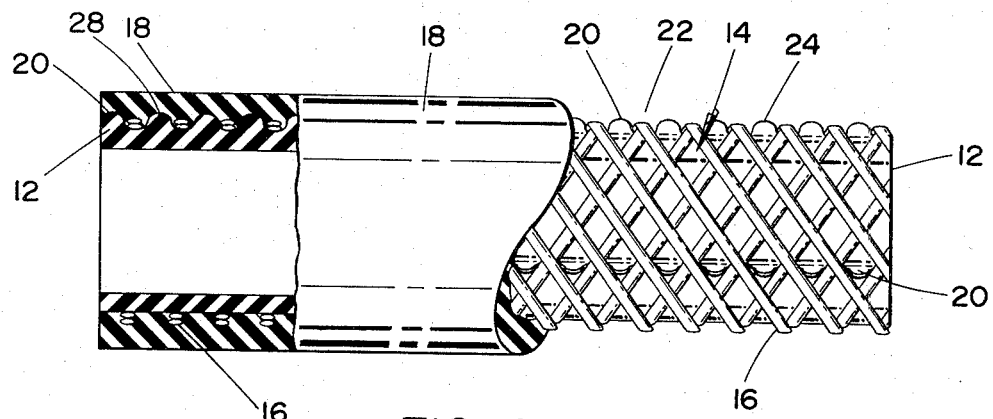
FIG. 2
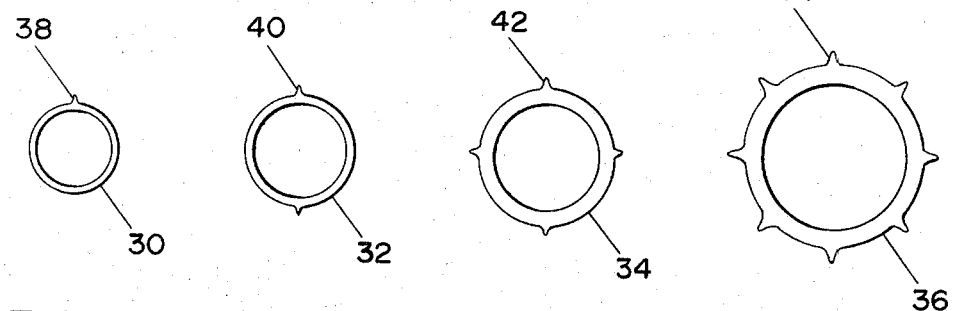
FIG. 4   FIG. 5   FIG. 6   FIG. 7

REINFORCED HOSE AND METHOD

BACKGROUND OF THE INVENTION

The invention relates to pipes and tubular conduits, but more particularly, the invention relates to flexible polymer hose with distinct layers that include means for mechanically retaining a twined strand reinforcement in position during manufacture thereof.

Flexible hose of the polymeric type typically includes a tube over which one or more plies of strands are twined into a reinforcement such as by braiding, knitting, or spiraling. A problem associated with the manufacture of such hose is keeping the reinforcement in proper position on the tube during various manufacturing stages. For example, a tube may be extruded and coiled into large receiving pans. The pan of tubing is then transferred to a machine where stands of reinforcement are applied. The reinforced tube is again coiled into large receiving pans. The coiling process may easily disrupt the placement of the twined strands. A cover or insulator is applied over the strands and tube. The assembly is cured, such as by vulcanizing in the case of thermosetting materials; or both the tube or cover are set; such as by lowering the temperature in the case of thermoplastic materials. Prior art solutions to retaining the reinforcement strands in position include applying an adhesive to the tube or strands and cementing them into position. Another manner in which the reinforcement displacement problem is solved is to interlace the reinforcement strands in such a manner that the twined reinforcement is not easily displaced over the tube. A spiraled reinforcement is more apt to be displaced than other types of twined reinforcement because the spiraled reinforcement does not include interlocking stitches or loops. However, the spiral reinforcement is more desirable over other types in that it may be applied faster while using less yarn to provide the same reinforcing effect.

While the prior art offers solutions for maintaining a twined reinforcement in proper position around the tube, they also introduce additional manufacturing steps (e.g. applying an adhesive) or cost of manufacture (e.g. time and material acquired for applying interlaced strands plus the additional cost of an adhesive). Also, while the prior art solutions have given satisfactory results, the twined reinforcement still may be displaced in such a manner as to introduce hose irregularities.

SUMMARY OF THE INVENTION

In accordance with the invention, a flexible hose or conduit is provided which includes mechanical means for holding one or more plies of reinforcement strands in position. A tube is formed that includes at least one rib radially extending throughout the length of tube. Strands are twined over the tube and ribs to define a reinforcement. The strands deform portions of the rib where they junction with the rib. The tube and reinforcement are insulated with a polymeric material. The material forms a cover or insulation for application of successive plies of reinforcement. The undeformed portions of ribs extend into the insulation layer forming a mechanical bond or interlock therewith.

It is an object of the invention to provide a hose having a twined reinforcement that is mechanically retained in position during stages of manufacture.

Another object of the invention is to eliminate a requirement for using an adhesive to maintain a reinforcement in position over a tube during manufacture.

Another object of the invention is to provide a process for manufacturing hose which excludes the step of applying adhesive to strands of a reinforcement for the purpose of holding the strands in proper position during succeeding steps of the manufacturing process.

The invention advantageously allows hose to be produced economically with spirally wound reinforcement strands.

These and other objects or advantages of the invention will be apparent after reviewing the figures and description thereof wherein:

FIG. 1 is an isometric cutaway view showing a tube, reinforcement, and cover.

FIG. 2 is a cutaway axial view of the conduit of FIG. 1.

FIG. 3 is an enlarged view of FIG. 2 showing mechanical retaining means.

FIGS. 4 through 7 are end views of conduits showing alternate forms of the invention.

DESCRIPTION OF PREFERRED EMBODIMENTS

Referring to FIGS. 1 through 3, flexible hose 10 of the invention is disclosed which includes a tube 12, a reinforcement 14 of twined strands 16, and cover 18. The tube is formed of a flexible polymeric material by known processes such as extrusion. The polymeric material may be of the thermosetting type such as natural or synthetic rubbers or blends thereof; or of the thermo-type which includes plastics such as nylon and polyvinylchloride which are set by cooling. One or more radially extending ribs 20 are formed integral with the tube throughout its length. The ribs 20 may extend as longitudinal, or helical elements along the tube exterior. At least one rib is required throughout the length of the tube although a plurality of ribs are preferred. As a general rule, a larger diameter hose requires a greater number of circumferentially spaced ribs than a smaller diameter hose. By way of illustration and not limitation, a 9/16 in. diameter hose has been satisfactorily manufactured with these substantially equally circumferentially spaced ribs. When multiple ribs 20 are used, they may be equally or randomly spaced without detracting from the intended advantages or scope of this invention.

The height, width, or shape of the ribs may be varied as desired provided certain flexural characteristics or physical properties are maintained. These requirements will be later discussed. The reinforcement 14 of multiple strands 16 is twined over the tube 12 and ribs 20. Any reinforcement pattern may be used but the greatest advantages of the invention are realized with a spirally wound reinforcement. For this reason, a spirally wound ply of reinforcement is illustrated that includes a first strand layer spiraled helically around the tube and an oppositely wound second strand layer formed over the first strand layer and tube.

The strands are tensioned as they are spiraled. The tensioned strands deform, cut, bend, or otherwise displace 22 portions of the rib or ribs 20 at their points of junction or cross-over therewith. The rib has physical properties to allow such displacement. The displaced portions 22 and undisplaced portions 24 define a pseudo-corrugation throughout the length of hose which mechanically holds or positions each reinforcement strand. A converging cross-sectional rib shape such as a triangular shape, has proven satisfactory as it allows easy deformations to take place at the extreme apex point while providing a larger hose support area at the tube. Preferably, the rib 20 height is greater than the thickness of the reinforcement 14 ply to insure that the radially outermost strand 26 is mechanically held in position. More preferably, the rib height does not exceed the thickness of the cover 18 nor more than twice the thickness of the reinforcement ply 14.

The cover is applied over the reinforcement 14, tube 12 and ribs 20. Optionally, an insulator having ribs formed exteriorly thereof may be used in lieu of a cover for application of successive reinforcement plies. The undeformed portions 24 of the ribs extend into the cover forming a pseudo-corrugated mechanical interlock 28 as shown in FIG. 2.

During the manufacturing process, the tube, tube with reinforcement, and tube with cover or insulator may be handled several times with several time delays prior to a final step of curing or setting the polymeric material of the tube and cover. It is during handling of the reinforcement tube that displacement of strands 16 of the reinforcement is likely to occur. The reinforced tube may be coiled in large pans to facilitate storage and easy transfer of the assembly to the next stage or step of the manufacturing process. As the reinforced tube is coiled or "panned," the radially outer portion of the tube of each coil stretches while the radially inner portion of the tube coil compresses. The relative movement between the outside and inside radius introduces forces which tend to displace the strands 16 of the reinforcement. The displaced portion 22 of the rib or ribs holds the strands in their proper position relative to the tube. When the hose is again straightened for the purpose of applying a cover 18 or insulator, the strands 16 of the reinforcement return to their proper position by the ribs.

The strands 16 may tend to be displaced even though the step of panning or coiling the assembly is omitted. Many modern reinforcement strands such as greige polyester, nylon, Fiber B or Nomex as sold by duPont, or the like, have a low coefficient of friction with respect to each other or with some polymeric materials. The slipperiness or low coefficient of friction between strands is known in the art as being "sleezy." When sleezy reinforcement strands are used to twine a reinforcement, the displaced portion 22 of the rib or ribs hold the individual strands in desired position around the tube.

Many thermoplastic polymeric materials which may be used for the tube such as nylon, Hytrel, as sold by duPont, or polyvinylchloride, exhibit a low coefficient friction with respect to textile materials used to twine the reinforcement. Gum frictions have been applied over such tubes, or adhesives applied to the reinforcement strands to retain the twined reinforcement in position over the tube or bonding a cover to the assembly. When ribs 20 of the invention are used for such tubes, the gum friction or adhesive may be eliminated. The undeformed portions 22 of the rib or ribs mechanically hold the strands of the reinforcement in position over the tube overcoming the "sleeziness" of the materials. Also, the undeformed portion of the rib or ribs define a multitude of pseudo convolutions that are filled with polymeric material as a cover or insulator is applied which mechanically bonds the cover or insulator to the tube.

ADDITIONAL SPECIES

Heretofore, a tube having three substantially equally spaced ribs is depicted in combination with a single ply of reinforcement and a smooth cover. However, the scope of the invention is not to be limited to the number of ribs nor to the number of reinforcement plies. FIGS. 4 through 7 show cross-sections of tubes 30, 32, 34, 36 or insulators which are typical of combinations which may be used. Examples 1, 2, 4, and 6 ribs 38, 40, 42, 44 are shown. Such combinations of ribs may be used for a tube in a manner as previously described in reference to FIGS. 1 through 3. If several plies of reinforcement are desired, the rib combinations may be used as insulator combinations and a second ply of reinforcement material applied over the insulator in the same manner as aboveset forth. A smooth or corrugated cover may be applied as desired.

The foregoing detail of description is made for purpose of illustration only and it is not intended to limit the scope of the invention which is to be determined from the appended claims.

What is claimed is:

1. A flexible hose comprising:
    a polymeric tube;
    a plurality of circumferentially spaced ribs integral with and radially extending from the exterior of the tube;
    a reinforcement of oppositely wound textile strands twined over the tube, the strands deforming portions of the ribs at points of contact therewith, undeformed portions of the ribs extending radially past the strands, and the ribs deformed to a point near the tube whereby the ribs mechanically hold and substantially maintain the strands of the reinforcement in spaced relationship on the tube; and
    a cover formed over the tube, reinforcements, and ribs, the undeformed portions of the ribs extending into portions of the cover mechanically interlocking their width.

2. A hose as set forth in claim 1 wherein the ribs have a cross-section shape that is generally triangular with an apex oriented substantially radially from the tube.

3. A hose as set forth in claim 1 wherein the ribs have a maximum width that is generally equal to or less than the strand gauge of the reinforcement.

4. A hose as set forth in claim 1 wherein the ribs are substantially equally circumferentially spaced around the tube.

5. A flexible hose of the type having a tube and a cover sandwiching an oppositely spiralled twined textile reinforcement of yarn strands in which the improvement comprises:
    at least one rib integral with and extending generally radially from the exterior of the tube, the rib deformed by the reinforcement at each point of contact therewith, undeformed portions of the rib extending radially past the strands, and the rib deformed to a point near the tube;
    whereby the rib mechanically holds and substantially maintains the strands of reinforcement in fixed spaced relationship with the tube, the undeformed portions of the ribs extending into portions of the cover mechanically interlocking therewith.

* * * * *